United States Patent

Natarajan et al.

[11] Patent Number: 5,489,465
[45] Date of Patent: Feb. 6, 1996

[54] EDGE SEAL TECHNOLOGY FOR LOW DIELECTRIC/POROUS SUBSTRATE PROCESSING

[75] Inventors: Govindarajan Natarajan, Pleasant Valley, N.Y.; Takeshi Takamori, Spokane, Wash.; Katharine G. Frase, Peekskill, N.Y.; Thomas E. Lombardi; Robert A. Rita, both of Wappingers Falls, N.Y.

[73] Assignee: International Business Machines Corporation, Armonk, N.Y.

[21] Appl. No.: 254,327

[22] Filed: Jun. 3, 1994

[51] Int. Cl.$^6$ .................................................. B32B 4/00
[52] U.S. Cl. .................... 428/210; 428/137; 428/209; 428/332; 428/426; 428/432; 428/433; 361/792; 264/56; 264/61; 264/63; 156/89
[58] Field of Search .................................. 428/209, 901, 428/210, 426, 432, 212, 332, 433, 137; 156/89; 264/56, 61, 63; 361/395

[56] References Cited

U.S. PATENT DOCUMENTS

| | | | |
|---|---|---|---|
| 4,104,345 | 8/1978 | Anderson et al. | 264/43 |
| 4,821,142 | 4/1989 | Ushitusa et al. | 361/395 |
| 4,879,156 | 11/1989 | Herron et al. | 428/137 |
| 5,085,720 | 2/1992 | Mikeska et al. | 156/89 |
| 5,135,595 | 8/1992 | Acocella et al. | 156/89 |
| 5,139,851 | 8/1992 | Acocella et al. | 428/209 |
| 5,147,484 | 9/1992 | Chance et al. | 156/89 |

*Primary Examiner*—Patrick J. Ryan
*Assistant Examiner*—Abraham Bahta
*Attorney, Agent, or Firm*—Whitham, Curtis, Whitham & McGinn; Ira Blecker

[57] ABSTRACT

A sealed composite ceramic structure is formed by first forming a plurality of composite green sheets. Each of the green sheets is a composite structure comprising a central portion of partially densifiable material and an outer portion of fully densifiable material. Next, top and bottom green sheets of fully densifiable material are formed. The greensheets are then stacked to form a laminated structure in the following order: the bottom green sheet, the plurality of composite green sheets, and the top green sheet. The substrate laminate is sintered to form the sealed structure having a porous central portion. The composite structure has particular application to ceramic substrates for mounting semiconductor devices requiring low dielectric constant substrates, but the structure also has applications in fluid processing using porous laminated structures. In both applications, the creation of a porous ceramic body with solid, sealed edges and/or external surfaces hold significant advantages.

13 Claims, 6 Drawing Sheets

EDGE SEAL TECHNOLOGY FOR LOW DIELECTRIC/POROUS SUBSTRATE PROCESSING

BACKGROUND OF THE INVENTION

1. Field of the Invention

The present invention generally relates to the field of low dielectric constant ceramic structures, and their manufacture and, more particularly to ceramic substrates for mounting semiconductor devices, and fluid processing using porous laminated structures. In both applications, the creation of a porous ceramic body with solid, sealed edges and/or external surfaces hold significant advantages.

2. Description of the Prior Art

Future substrate technology requires a dielectric medium with dielectric constant (K) less than 3.0. In general, a low dielectric ceramic substrate can be achieved by using low dielectric materials and well dispersed porosity (air) or a porous (porosity=10 to 50%) body with low K materials. When there is an open pore structure in the substrate, processing fluids in lap and polish and in thin film metallization can enter into the substrate and will cause corrosion and mechanical damage to the substrates. Therefore, it is extremely important that the top, bottom and edges around the substrate are sealed.

Glass ceramic structures, usually and preferably multi-layered, are used in the production of electronic substrates and devices. Many different types of structures can be used. For example, a multilayered ceramic circuit substrate may comprise patterned metal layers which act as electrical conductors sandwiched between ceramic layers which act as insulators. The substrates may be designed with termination pads for attaching semiconductor chips, connector leads, capacitors, resistors, covers, etc. Interconnection between buried conductor levels can be achieved through vias formed by metal paste-filled holes in the individual glass ceramic layers formed prior to lamination, which upon sintering, will become a sintered dense metal interconnection of metal based conductor.

In the case of ceramic packaging for semiconductor devices, the dielectric constant of the ceramic material is crucial to the performance of the semiconductor devices. A high dielectric constant in the substrate can contribute significantly, particularly in high performance or high frequency application, to both signal propagation delays and noise. Alumina is widely used for moderate performance applications, and provides excellent thermal and mechanical properties. For higher performance applications, glass ceramics and/or glass additions to an alumina matrix are currently used, these materials offer dielectric constants of 5 or less compared to alumina. However, as the density and speed of semiconductor devices increase, still further reductions in dielectric constant will be necessary in order for the ceramic packaging to keep pace with the devices.

The industry target is for a material with dielectric constant of 3 or less. In general, a low dielectric ceramic substrate structure can be achieved by using low dielectric materials and well dispersed porosity (air). A porous body of up to 50% porosity, inherently poses problems in subsequent process operations like, lapping, polishing and thin film metallization. Process fluids trapped in the structure can cause mechanical and structural damage to the substrate. Therefore, it is extremely important that the top, bottom and edges around the substrate are sealed. Another concern of an unsealed porous structure is the surface roughness, which is not an acceptable feature for thin film metallization.

While some polymeric materials can readily achieve this low dielectric constant, they suffer from poor thermal stability and poor thermal expansivity matching with the silicon devices mounted on the substrate. The latter mismatch can contribute to fatigue and reliability concerns at the interconnection between the devices and the substrate. Thin polymeric based film structures have historically been more expensive than ceramic packaging options as well. Ceramic can incorporate large amounts of silicate glass, having dielectric constants of 3.5 or porosity, with air having a dielectric constant of 1. However, both these routes degrade the mechanical performance of the composite ceramic material; high levels of porosity introduce the additional concerns of surface roughness and susceptibility to fluid entrapment.

SUMMARY OF THE INVENTION

It is therefore an object of the present invention to provide low dielectric constant ceramic structures and methods of manufacturing the same for use in electronic applications.

It is another object of the present invention that the lapping, polishing and thin film metallization be achieved without otherwise impacting on throughput and cycle time.

It is a further object of this invention to provide methods for achieving solid, impervious surfaces on a porous ceramic body, such that bulk mechanical strength is improved over a purely porous body, and processing fluid entrapment is eliminated.

According to the invention, a sealed porous substrate structure is formed through lamination of a plurality of composite greensheets. Each greensheet is a composite structure comprising a central portion of partially densifiable material and an outer portion of fully densifiable material. One or more of these composite greensheets are stacked between one or more top and bottom layers of fully densifiable material greensheets, laminated into a solid body, and sintered to achieve the final sealed porous substrate structure.

An obvious extension of this invention is to the processing fluids, where a porous body can be converted from a "three-dimensional sponge" to a one- or two-dimensional channel by judicious edge sealing. Accordingly, it is yet another object of the present invention to provide sealed porous ceramic structures which, due to their mechanical structure, are useful in the field of fluid processing.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1A:
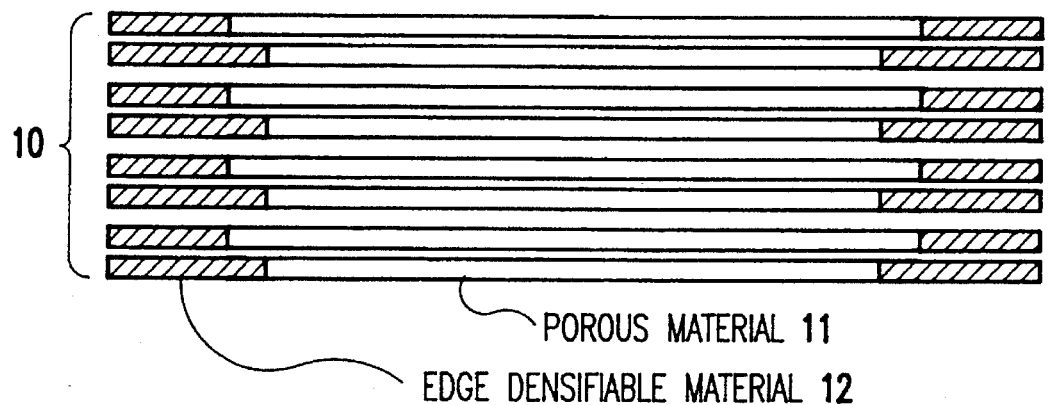
FIG. 1A is a cross-sectional side view showing a stack of edge sealed porous sheets prior to lamination of the sheets.

Referring now to the drawings, and more particularly to FIG. 1A, there is shown a plurality of composite green sheets 10 in the form of edge sealed frames made of sheets of porous material 11 having densifiable edge frames 12. In this cross-sectional view of the stacked composite greensheets, the interior of each greensheet is comprised of the nondensifiable ceramic material, suspended in the appropriate binder system, while the edges of each greensheet are comprised of the densifiable material, also suspended in the binder system. These sheets are stacked in an alternating pattern of the boundary between the two materials on adjacent sheets. This alternating pattern provides both mechanical strength and protects against leakage path through the boundary area itself. The interleaving of the joints on adjacent greensheets increases both the mechanical integrity of the composite body and the bonding of the joints themselves.

The porous material 11 is a low K dielectric constant material and may be made by adding silica particles to glass in proportions according to Table 1 to achieve a desired porosity.

TABLE 1

| Starting Composition | | Apparent | | Mechanical |
| --- | --- | --- | --- | --- |
| Glass (g) | Silica (g) | Density | Porosity % | Strength (MPa) |
| 1200 | — | 2.59 | 1 | 211.42 |
| 900 | 300 | 2.03 | 18.8 | 112.08 |
| 900 | 300 | 1.93 | 22.8 | 103.48 |
| 900 | 300 | 1.96 | 21.6 | 104.58 |
| 800 | 400 | 1.61 | 34.5 | 63.28 |
| 800 | 400 | 1.68 | 33.2 | 67.06 |
| 800 | 400 | 1.65 | 31.7 | 68.37 |
| 700 | 500 | 1.45 | 40.3 | 45.06 |
| 700 | 500 | 1.46 | 39.8 | 47.99 |
| 700 | 500 | 1.48 | 39.0 | 51.19 |

As can be seen in Table I, the addition of silica to the base glass (of the preferred family of glass formulations disclosed in Kumar et al., U.S. Pat. No. 4,413,061, which is incorporated by reference herein) decreases both the apparent density and the mechanical strength of the new composition with respect to the base glass. During sintering, the base glass at least partially crystallizes to form a ceramic. Such a material is called a glass-ceramic material. The silica retards or inhibits the sintering of the base glass. Other materials such as alumina, mullite, aluminum nitride, borosilicate glass, etc., may be used for the present invention along with appropriate additives to retard sintering.

Figure 1B:
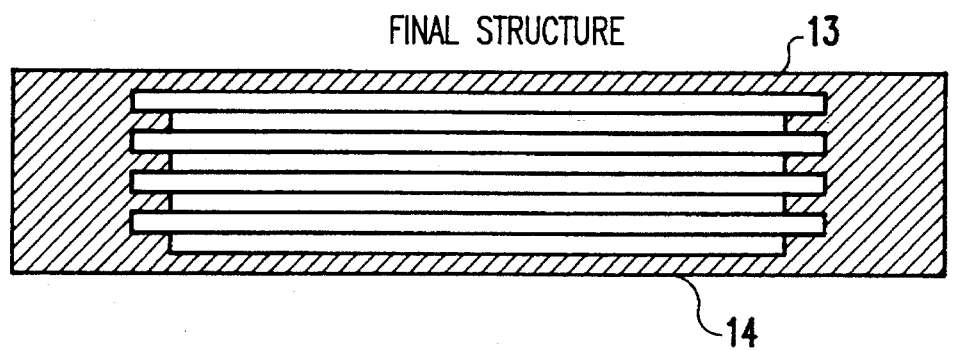
FIG. 1B is a cross-sectional side view showing the laminated structure produced from the stack of porous sheets in FIG. 1A.

FIG. 1B shows the laminated and sintered result of the stacked sheets from 1A. FIG. 1B includes the use of densifiable top and bottom greensheets 13 and 14 appropriate for electronic applications. It is also possible to use a composite greensheet for the top and/or bottom most layer(s) to achieve a one-dimensional porous tunnel for fluid processing. For electronic applications, the top and bottom surfaces, and the entire periphery of the sintered body, are densified and impervious to liquids, while the bulk of the sintered body retains its porosity, and thus its reduced dielectric constant.

Figure 2:
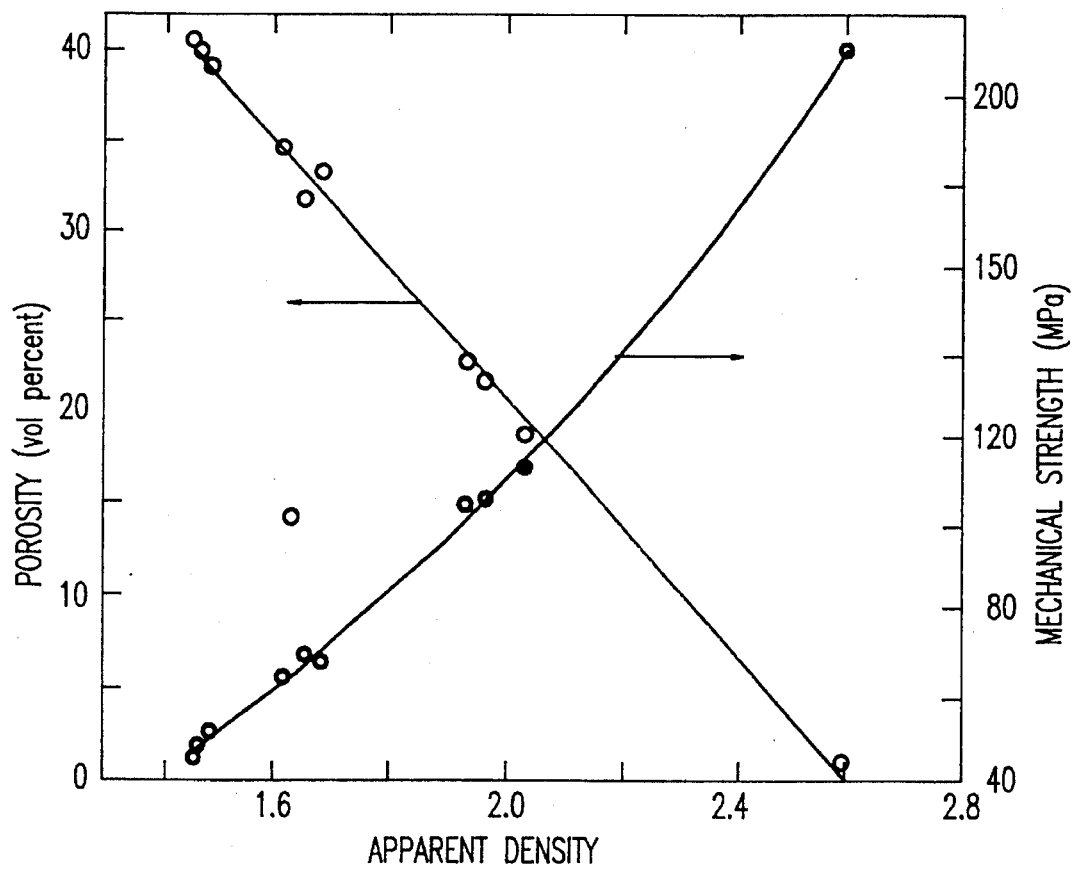
FIG. 2 is a graph showing resultant apparent density, porosity, and mechanical strength of porous materials which may be used in the structures shown in FIGS. 1A and 1B.

Graphs of the resultant apparent density, porosity, and mechanical strength (four point flexural strength) of sintered ceramic material are shown in FIG. 2. The materials of the edge sealed frames 12 will densify in a sintering process to 90–100% of theoretical density (i.e., any porosity is closed porosity) and have high strength. The central porous material will have lower strength. The edge frame structure 12 is designed such as to weave with the low K material green sheets 11 to give good bonding and enhance the strength of the sintered composite layer. As shown in FIG. 1B, the composite green sheets are laminated with top and bottom sheets 13 and 14 of fully densifiable material, and the structure is sintered to produce a strong, sealed porous structure comprising a multilayer ceramic substrate having a central porous portion and an outer densified portion.

The above changes in density and mechanical strength are attributed to the higher level of porosity in the silica-rich compositions. As porosity increases, density decreases. However, since in most actual service conditions the major contributor to poor mechanical strength is surface flaws, by making all the external surfaces of the composite body fully dense, the apparent mechanical strength of the body will be increased, while the porosity of the total body will be relatively little effected. The base glass itself represents the edge, or densifiable, material. It is important to note that the sintering process is designed to achieve full density in the base glass itself, so the silica acts as a retardant to densification in the silica-rich compositions. An obvious extension of this concept is to substitute other sintering inhibitors for the silica used in this example.

Figure 3A:
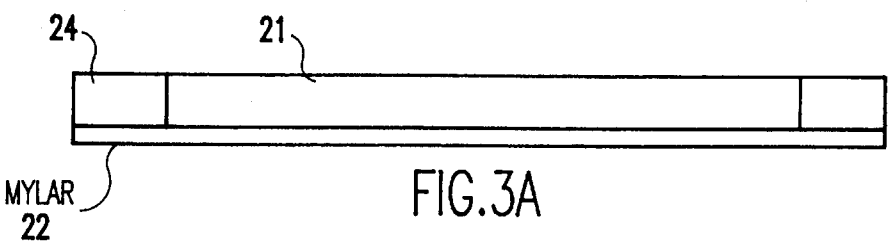
FIGS. 3A and 3B are respectively a cross-sectional side view and a plan view of a single green sheet on a polymeric film showing punching and cutting to define a window frame and facilitate its removal.
Figure 3B:
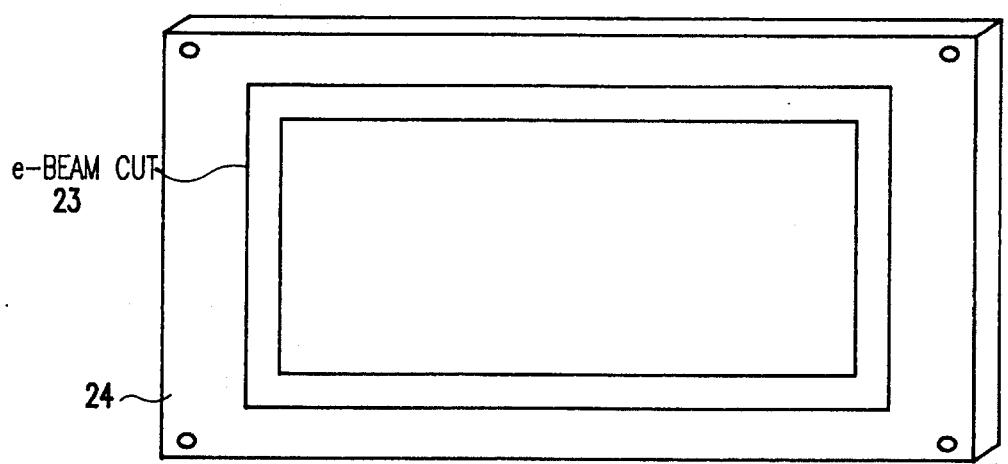

FIGS. 3 to 5 show one way to make green sheets with edge frames of different material and to control the alignment between layers. A slurry of ceramic particulate, binder, plasticizers, and solvents is prepared and then spread or cast into green sheets. The porous material green sheet 21 is formed on a thin polymeric film 22, as shown in FIG. 3A. The polymeric film 22 may be, for example, Mylar. The green sheet is punched and screened using electron beam (e-beam) technology and, in addition, an e-beam cut 23 is made to facilitate the window frame edge 24 removal, as shown in FIGS. 3A and 3B. The cross-hatched areas represent the metallization pattern on the greensheet, suitable for use in a multi-layer-ceramic fabrication process, including both vias and X-Y wiring. Outside the cross hatched (active) area, the greensheet 21 has been cut, by one of a number of techniques, including by not limited to e-beam or laser to define a "window frame" of unmetallized greensheet material. The polymeric film carrier 22 has not been cut.

Figure 4A:
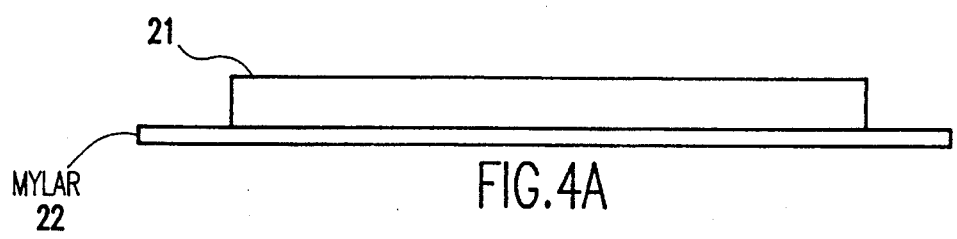
FIGS. 4A and 4B are respectively a cross-sectional side view and a plan view of the single green sheet on a polymeric film showing the removal of the window frame.
Figure 4B:
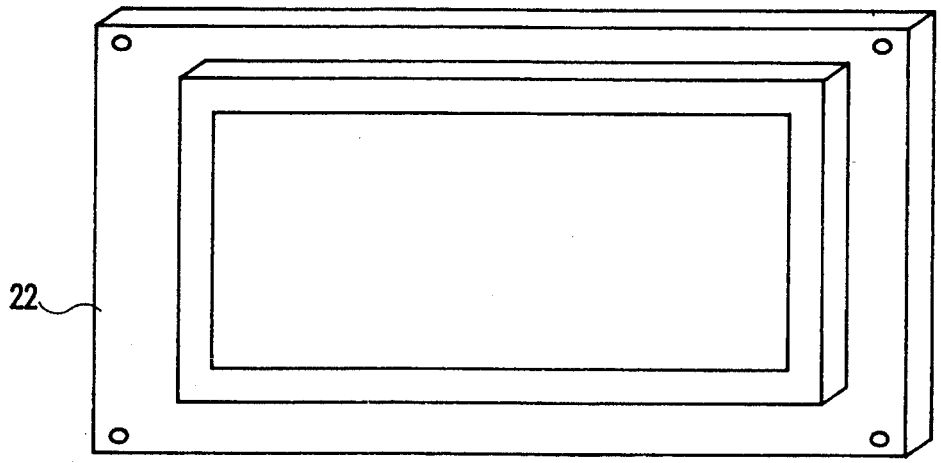
Figure 5A:
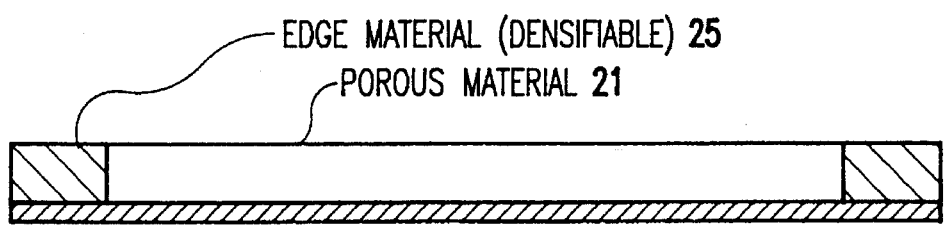
FIGS. 5A and 5B are respectively a cross-sectional side view and a plan view of the single green sheet showing the addition of edge material prior to lamination.
Figure 5B:
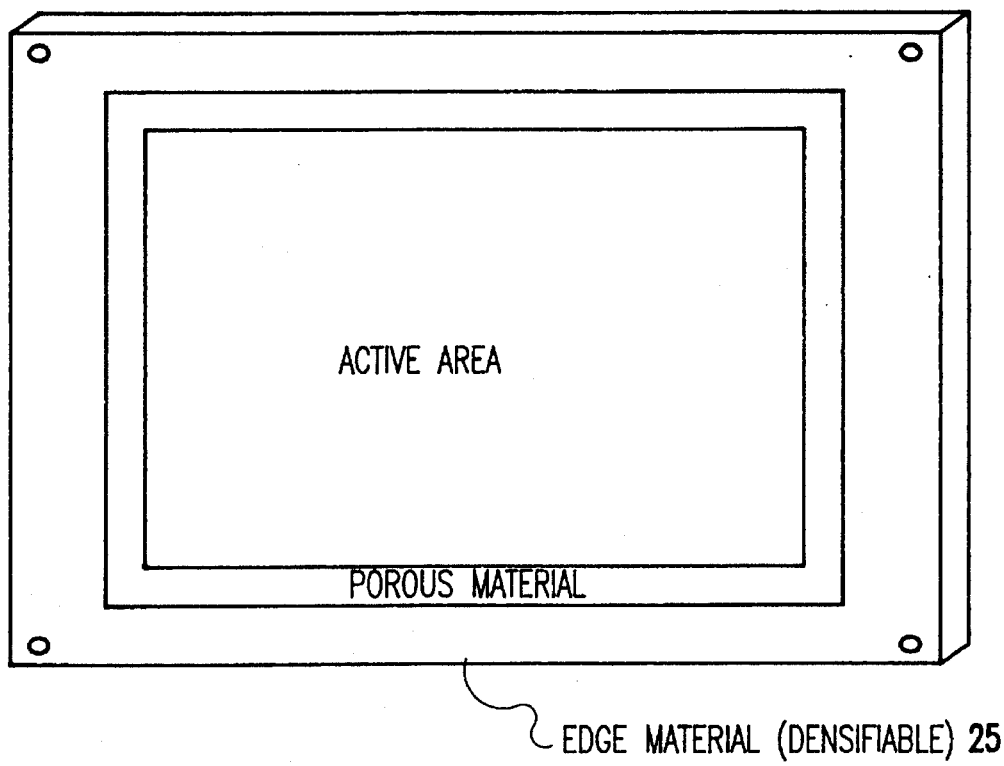

FIGS. 4A and 4B show the green sheet after the edge frame has been removed from the polymeric film carrier 22, leaving the polymeric film carrier bare around the periphery of the greensheet 21. Next, a densifiable edge material 25 is joined about the periphery of the green sheet 21 on the polymeric film carrier 22, as shown in FIGS. 5A and 5B. As both the densifiable and non-densifiable materials are suspended in the same binder system, a surface coating of the binder itself will encourage joining across the interface 26. The surface coating of the binder may be applied, for example, by spray coating. The use of the polymeric film carrier 22 both enables the substitution and provides mechanical support for the greensheet 21 during this operation, reducing handling damage to the greensheet itself. The resulting composite structure is then removed from the polymeric film carrier 22 prior to stacking as shown in FIG. 1A.

Figure 7A:
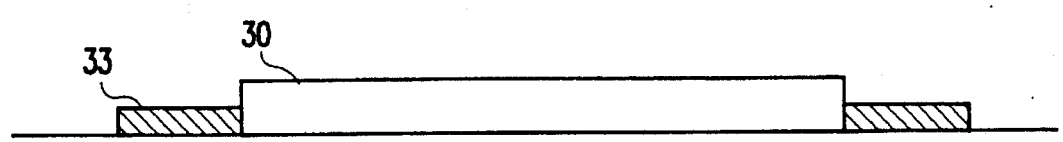
FIGS. 7A and 7B are cross sectional side views showing the addition of a window frame of densifiable materials to replace the removed window frame.
Figure 7B:
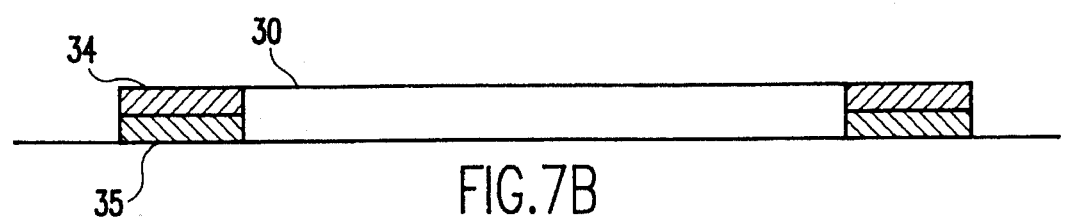
Figure 8:
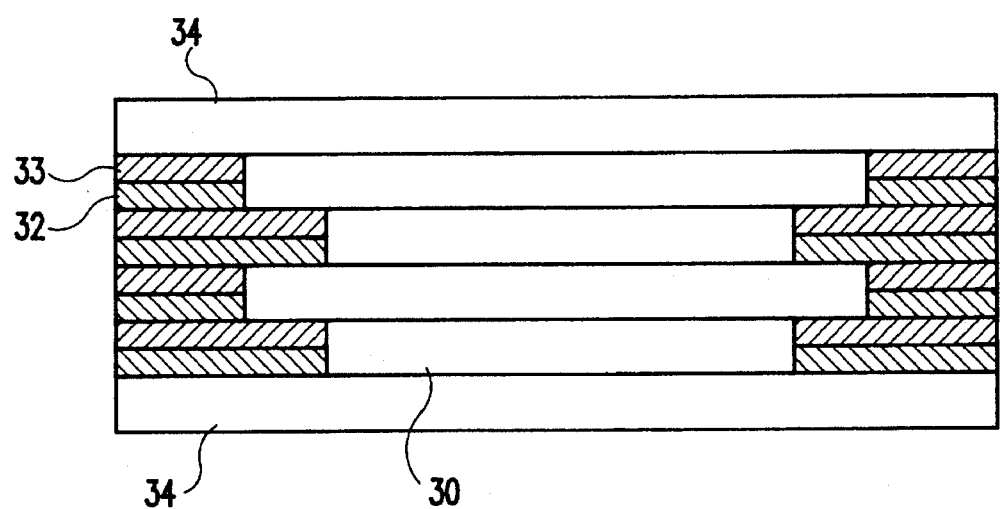
FIG. 8 is a cross-sectional view, similar to FIG. 1B, showing the stacked sheets prior to lamination and sintering.

FIGS. 6 to 8 depict an alternate method for fabricating the individual composite greensheets, and also an alternate method for accomplishing the bonding of the joints between the porous and dense materials. It is known to use a metal conductor paste including glassy materials will assist the bonding of ceramic greensheets. In this embodiment, the addition of metal to the periphery of the ceramic body will further improve the mechanical properties of the composite by providing toughening mechanisms against edge defects. In addition, the ceramic and metal material will decrease the shrinkage of the outer portion of the composite layer so as to more closely match the shrinkage of the porous central portion.

Figure 6A:
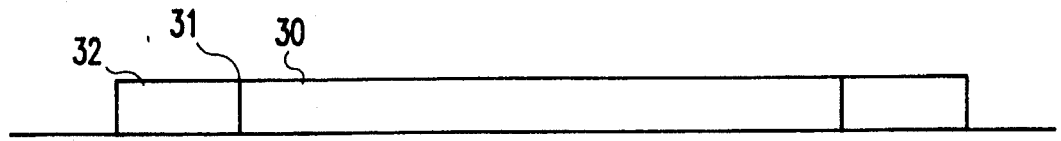
FIGS. 6A and 6B are cross-sectional side views showing the same steps as FIGS. 3B and 4B above, that is, the definition of a window frame of the nondensifiable material and the removal of that window frame from the polymeric film carrier.
Figure 6B:

FIGS. 6A and 6B are cross-sectional views similar to FIGS. 3B and 4B, respectively. A sheet of low dielectric constant material 30 has an e-beam cut 31 made to define a window frame of material 32 in FIG. 6A, and in FIG. 6B, the window frame is removed, as in the first embodiment. In the second embodiment, two densifiable materials are used to replace the window frame. More particularly, as shown in FIG. 7A, a densifiable greensheet 33 is added, but this densifiable greensheet 33 is thinner than nondensifiable greensheet 30. Then, in FIG. 7B, a layer of ceramic and metal paste 34, which is also densifiable, is added to make up the difference in height and to encourage joining between layers.

FIG. 8 show the stacked sheets prior to lamination and sintering similar to FIG. 1B. More particularly, FIG. 8 shows a composite structure which includes the use of densifiable top and bottom greensheets 33 appropriate for electronic applications. As in the case of FIG. 1B, it is also possible to use a composite greensheet for the top and/or bottom most layer(s) to achieve a one-dimensional porous tunnel for fluid processing. For electronic applications, the top and bottom surfaces, and the entire periphery of the sintered body, are densified and impervious to liquids, while the bulk of the sintered body retains its porosity, and thus its reduced dielectric constant. In this embodiment, the densifiable greensheet 33 and the densifiable ceramic and metal paste 34 encourage joining between the layers.

While the invention has been described in terms of two preferred embodiments with applications in diverse fields of electronics and fluid processing, those skilled in the art will recognize that the invention can be practiced with modification within the spirit and scope of the appended claims. The structures and methods disclosed are amenable to a wide variety of glasses, ceramics and glass-ceramics.

Having thus described our invention, what we claim as new and desire to secure by Letters Patent is as follows:

1. A sealed composite ceramic structure comprising a multilayer ceramic substrate, each layer having a central porous portion and an outer densified portion, said composite structure being laminated and sintered.

2. The sealed composite ceramic structure recited in claim 1 wherein said outer densified portion is composed of a densified ceramic material having a thickness less than said central porous portion and a densified ceramic and metal material overlaying said densified ceramic material.

3. The sealed composite ceramic structure recited in claim 1 further comprising top and bottom layers of densified material which, in combination with the outer densified portions of each of said layers, seals the central porous portions of the said layers from external contamination and provides a structural rigidity to the structure.

4. The sealed composite ceramic structure recited in claim 3 wherein said structure is a ceramic substrate for mounting semiconductor devices in an electronic circuit, said substrate being characterized by a low dielectric constant.

5. The sealed composite ceramic structure recited in claim 4 wherein said central porous portions include vias and X-Y wiring for said electronic circuit.

6. The sealed composite ceramic structure recited in claim 4 wherein the dielectric constant of the substrate is less than 3.

7. The sealed composite ceramic structure recited in claim 1 wherein each of said layers are formed with a window frame of densified material surrounding said central porous portion and a width dimension of the window frame of densified material is larger and smaller in alternate layers of the structure.

8. A method of forming a sealed ceramic composite structure comprising the steps of:

(a) forming a plurality of composite green sheets, each of said green sheets comprising a central portion of partially densifiable material and an outer portion of fully densifiable material;

(b) forming a top and bottom green sheet of fully densifiable material;

(c) stacking and laminating said green sheets formed in steps (a) and (b) in the following order to form a substrate laminate: the bottom green sheet, the plurality of composite green sheets, and the top green sheet; and (d) sintering said substrate laminate to form a sealed porous substrate structure.

9. The method of forming a sealed composite ceramic structure recited in claim 8 wherein step (a) comprises the steps of:

(e) depositing a greensheet layer of partially densifiable material on a polymeric film carrier;

(f) cutting a window frame outline in said greensheet layer;

(g) removing the outer, window frame portion of the greensheet layer from the polymeric film carrier; and (h) applying a densifiable material to the polymeric film carrier in place of the removed outer, window frame portion of the greensheet.

10. The method of forming a sealed composite ceramic structure recited in claim 9 wherein step (h) comprises the steps of:

applying a densifiable ceramic material having a thickness less than said central partially densifiable material; and overlaying the densifiable ceramic material with a densifiable ceramic and metal paste.

11. The method of forming a sealed composite ceramic structure recited in claim 9 further comprising the step of removing the polymeric film carriers from each of said composite green sheets prior to said stacking and laminating step (c).

12. The sealed composite ceramic structure recited in claim 1, wherein, for each said layer, said central portion comprises ceramic particulate suspended in a central portion binder system and said outer densified portion comprises ceramic particulate suspended in an outer portion binder system, wherein said central portion binder system and said outer portion binder system are the same.

13. The method of forming a sealed composite ceramic structure recited in claim 8, wherein, for each of said green sheets of step (a), providing said central portion of partially densifiable material as comprising ceramic particulate suspended in a central portion binder system, and providing said outer portion of fully densifiable material as comprising ceramic particulate suspended in an outer portion binder system, wherein said central portion binder system and said outer portion binder system are the same.

* * * * *